US010778352B2

(12) United States Patent
Rosenfeld et al.

(10) Patent No.: US 10,778,352 B2
(45) Date of Patent: Sep. 15, 2020

(54) SYSTEM AND METHOD FOR DETECTING AUDIO MEDIA CONTENT

(71) Applicant: M.B.E.R. TELECOMMUNICATION AND HIGH-TECH LTD, Jerusalem (IL)

(72) Inventors: Moshe Rosenfeld, Jerusalem (IL); Shimon Mizrahi, Beit Shemesh (IL); Eliya Shtraser, Modiin Iilit (IL); David Barmatz, Hashmonaiim (IL); David Mizrahi, Beit Shemesh (IL); Tamar Klain, Jerusalem (IL)

(73) Assignee: M.B.E.R Telecommunication and High-tech Ltd, Jerusalem (IL)

( * ) Notice: Subject to any disclaimer, the term of this patent is extended or adjusted under 35 U.S.C. 154(b) by 0 days.

(21) Appl. No.: 16/067,694

(22) PCT Filed: Apr. 8, 2016

(86) PCT No.: PCT/IL2016/050375
§ 371 (c)(1),
(2) Date: Jul. 2, 2018

(87) PCT Pub. No.: WO2017/118966
PCT Pub. Date: Jul. 13, 2017

(65) Prior Publication Data
US 2019/0013887 A1    Jan. 10, 2019

Related U.S. Application Data

(60) Provisional application No. 62/274,796, filed on Jan. 5, 2016.

(51) Int. Cl.
*G10L 17/00* (2013.01)
*H04H 60/31* (2008.01)
(Continued)

(52) U.S. Cl.
CPC ........... *H04H 60/31* (2013.01); *H04H 60/58* (2013.01); *G06Q 30/0246* (2013.01)

(58) Field of Classification Search
CPC combination set(s) only.
See application file for complete search history.

(56) References Cited

U.S. PATENT DOCUMENTS 4,903,306 A    2/1990  Nakamura
9,412,373 B2 *  8/2016  Ma ..................... G10L 15/065
(Continued)

OTHER PUBLICATIONS

ISA: Israel Patent Office; Jerusalem, Israel; Jul. 19, 2016.
European Search Report; The Hague; Jun. 18, 2019.

*Primary Examiner* — Amir H Etesam
(74) *Attorney, Agent, or Firm* — Patshegen IP LLC; Moshe Pinchas

(57) ABSTRACT

A system for monitoring media exposure is provided. The system includes a remote device configured to receive a sample audio signal, to extract at least one unique parameter of the sample audio signal and to form a first dataset including data related to a presence of the unique parameter; a central device configured to receive the first dataset from the remote device, and to obtain at least one second dataset related to a presence of at least one unique parameter extracted from a media audio signal received from at least one media source; wherein the central device is further configured to evaluate correspondence between the first dataset and the second dataset and to collect data related to exposure of the remote device to the at least one media audio signal in accordance with the correspondence.

18 Claims, 8 Drawing Sheets

(51) Int. Cl.
 *H04H 60/58* (2008.01)
 *G06Q 30/02* (2012.01)

(56) References Cited

U.S. PATENT DOCUMENTS

| | | |
|---|---|---|
| 9,704,486 B2 * | 7/2017 | Basye .................... G10L 15/28 |
| 2009/0259690 A1 | 10/2009 | Bogdanov |
| 2010/0257052 A1 | 10/2010 | Zito et al. |
| 2014/0254807 A1 | 9/2014 | Fonseca, Jr. et al. |

* cited by examiner

FIG 2C

| 860 | 519 | -1369 | 691 | 573 | -338 | 322 | 213 | 330 | 318 | -376 | -132 | 1014 | 299 | 452 |
|---|---|---|---|---|---|---|---|---|---|---|---|---|---|---|
| 338 | 106 | -208 | 746 | 238 | 7 | -1063 | 771 | -1188 | 350 | 196 | -458 | 547 | -747 | -267 |
| -699 | -452 | -525 | -581 | 137 | -752 | 329 | 682 | -478 | 376 | -49 | -371 | 360 | -163 | -577 |
| 1272 | -463 | 849 | -603 | 351 | -360 | -365 | -221 | 639 | -815 | -418 | -153 | -707 | -264 | 409 |
| -913 | -430 | -686 | 411 | 525 | -653 | 674 | 162 | 793 | -735 | 849 | 121 | 485 | 44 | 458 |
| 722 | 888 | -206 | 808 | 240 | -874 | -478 | 531 | -20 | -840 | 814 | -393 | -533 | 291 | -698 |
| -1257 | 793 | -1095 | -37 | 351 | 628 | 31 | -60 | 598 | 460 | 678 | -426 | 869 | -285 | -557 |
| -60 | 210 | -559 | -407 | -1145 | -869 | 341 | -174 | -544 | -1425 | 539 | -838 | -137 | 293 | 404 |
| 157 | -622 | 581 | 850 | 828 | 592 | 285 | 564 | 910 | -535 | 1037 | 55 | -652 | 30 | 505 |
| -30 | 836 | 793 | -757 | 98 | 32 | -840 | -483 | -546 | 83 | -430 | -268 | 554 | 207 | 360 |
| -59 | -313 | -596 | -112 | 421 | 667 | -548 | -305 | 784 | 33 | 82 | -107 | 110 | 106 | 135 |
| -700 | -687 | -356 | -1004 | 420 | -390 | 337 | -17 | 371 | -217 | 780 | 157 | -196 | -790 | 378 |
| 1038 | -257 | 506 | 995 | 276 | 1045 | -782 | -373 | 199 | 163 | -965 | -735 | 115 | -76 | 973 |
| 769 | 338 | 722 | -915 | -1319 | 623 | -1097 | 269 | -833 | -281 | 674 | 822 | 547 | 116 | 521 |

FIG 2D

| | | | | | | | | | | | | | | |
|---|---|---|---|---|---|---|---|---|---|---|---|---|---|---|
| 0 | 1 | 0 | 0 | 1 | 0 | 1 | 0 | 0 | 0 | 0 | 0 | 1 | 1 | 0 |
| 0 | 0 | 0 | 0 | 0 | 1 | 1 | 0 | 1 | 0 | 0 | 0 | 0 | 0 | 0 |
| 0 | 0 | 0 | 0 | 1 | 0 | 0 | 0 | 0 | 1 | 0 | 0 | 1 | 0 | 0 |
| 0 | 1 | 1 | 0 | 0 | 0 | 1 | 0 | 0 | 1 | 0 | 0 | 1 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 1 | 0 | 0 | 1 | 0 | 1 | 1 | 0 | |
| 0 | 0 | 0 | 0 | 1 | 0 | 0 | 0 | 0 | 0 | 0 | 0 | 0 | 0 | |
| 0 | 0 | 1 | 1 | 0 | 0 | 0 | 0 | 0 | 0 | 0 | 0 | 0 | 0 | |
| 0 | 0 | 0 | 0 | 1 | 1 | 0 | 1 | 0 | 0 | 1 | 0 | 1 | 0 | |
| 0 | 0 | 0 | 0 | 0 | 0 | 0 | 0 | 0 | 0 | 0 | 0 | 0 | 0 | |
| 0 | 0 | 0 | 0 | 0 | 0 | 0 | 0 | 0 | 0 | 0 | 0 | 1 | 0 | |
| 0 | 1 | 0 | 0 | 0 | 0 | 1 | 0 | 0 | 0 | 0 | 0 | 0 | 0 | |
| 0 | 0 | 0 | 0 | 0 | 0 | 0 | 0 | 0 | 0 | 0 | 0 | 0 | 0 | |
| 0 | 0 | 0 | 0 | 0 | 0 | 0 | 0 | 0 | 0 | 0 | 0 | 1 | 0 | |

SYSTEM AND METHOD FOR DETECTING AUDIO MEDIA CONTENT

FIELD OF INVENTION

The presently disclosed subject matter relates to a system and method for detecting and measuring audio media content, in general, and in particular to a system and method for measuring exposure to media content.

BACKGROUND

Media Channels and advertisers, are measuring the size of their audiences, so as to assess profitability of airtime. These measurements indicate the number of people that are exposed to the media content.

U.S. Pat. No. 8,358,966 B2 User exposure to media items is detected and measured. A mobile client device carried by a user digitally samples the audio environment of the user on a regular basis. These samples are transformed into a stream of data signatures and compared with reference media items to detect user exposure to the reference items. Purchase behavior following exposure to selected media content items can be detected and tracked as well, so as to gauge effectiveness of media items such as advertisements.

SUMMARY OF INVENTION

According with an aspect of the presently disclosed subject matter there is provided a system for monitoring media exposure. The system includes a remote device configured to receive a sample audio signal, to extract at least one unique parameter of the sample audio signal and to form a first dataset including data related to a presence of the unique parameter; a central device configured to receive the first dataset from the remote device, and to obtain at least one second dataset related to a presence of at least one unique parameter extracted from a media audio signal received from at least one media source; wherein the central device is further configured to evaluate correspondence between the first dataset and the second dataset and to collect data related to exposure of the remote device to the at least one media audio signal in accordance with the correspondence.

The at least one unique parameter can include an instance of intensity at a frequency range which can be unusual with respect adjacent frequency ranges of the sample audio signal.

The instance of intensity at a frequency range can beat a certain timeslot of the and wherein the instance can be unusual with respect to adjacent timeslots of the sample audio signal.

A difference between a value of the instance of intensity and values of intensities of the adjacent frequency ranges can be above a predetermined threshold.

The sample audio signal can include a plurality of frequency ranges and a plurality of timeslots and wherein the dataset can include data related to presence of the unique parameter in each of the frequency ranges for each of the timeslots. The first dataset and the second dataset can include Boolean data type indicating the presence of the unique parameter. The values of the unique parameter are omitted from the dataset.

The central device can be configured to receive the media audio signal from the at least one media source, to extract the at least one unique parameter and to form thereby the second dataset.

The central device can be configured to receive media audio signals from a plurality of media sources and to obtain a second dataset from each of the media audio signals.

The remote device can be configured to detect unique parameters by generating a signal matrix of digital values each representing a value of a parameter of the sample audio signal for a certain frequency range at a certain timeslot; and by applying matrix multiplication between at least one segment of the signal matrix and a filter matrix configured such that a sum of products of the matrix multiplication provides a value above a predetermined threshold when the segment can include the unique parameters therein.

The first dataset can include a sample binary matrix having a first value for indicating the presence, and a second value for indicating lack of presence of the unique parameter.

The central device can be configured to receive the media audio signal from the media source and to detect the unique parameter in the media audio signal and to form a media binary matrix having a first value for indicating the presence, and a second value for indicating lack of presence of the unique parameter.

The central device can be configured for comparing between each value of the sample binary matrix and a corresponding value of at least a segment of the media binary matrix, and for assessing a number of matching values; wherein evaluating the correspondence can include assessing a ratio between the number of matching values and a total number of values in the media binary matrix.

Matching values include a second value in the sample binary matrix and a first value in a corresponding location in the media binary matrix. The media audio signal can be longer than the sample audio signal.

The central device can be further configured for selecting a first segment of the media binary matrix and comparing between each value of the sample binary matrix and a corresponding value the first segment, the central device can be further configured for selecting a second segment of the media binary matrix and comparing between each value of the sample binary matrix and a corresponding value the second segment; wherein the central device can be further configured for assessing a first sum of matching values between the first segment and the sample binary matrix and a second sum of matching values between the second segment and the sample binary matrix; wherein evaluating the correspondence can include assessing a ratio between the first sum and the second sum.

The central device can be configured to receive the first dataset, and to receive a streaming audio signal from the at least one media source and to obtain the second dataset relating to a section of the streaming audio extending from a predetermined time before the dataset was received until a time in which the first dataset was received.

There is provided in accordance with another aspect of the presently disclosed subject matter a method for determining correspondence between a media audio signal of a media source and a sample audio signal. The method can include receiving at the remote device a sample audio signal; detecting at the remote device at least one unique parameter in the sample audio signal; forming at the remote device a first dataset including data related to a presence of the unique parameter; receiving at the central device the first dataset from the remote device; obtaining at the central device at least one second dataset related to a presence of at least one unique parameter extracted from a media audio signal received from at least one media source; and evaluating correspondence between the first dataset and the second dataset.

The step of detecting unique parameters can include generating a signal matrix of digital values each representing a value of a parameter of the sample audio signal for a certain frequency range at a certain timeslot; and applying matrix multiplication between a at least one segment of the signal matrix and a filter matrix configured such that a sum of products of the matrix multiplication provides a value above a predetermined threshold when the segment of the signal matrix can include the unique parameters therein.

The step of forming a first dataset can include forming a sample binary matrix including a first value for indicating the presence, and a second value for indicating lack of presence of the unique parameter.

The step of obtaining the at least one second dataset can include receiving the media audio signal from the media source; detecting the unique parameter in the media audio signal; and forming a media binary matrix including a first value for indicating the presence, and a second value for indicating lack of presence of the unique parameter.

The step of evaluating correspondence can include comparing between each value of the sample binary matrix and a corresponding value of at least a segment of the media binary matrix, and assessing a number of matching values; wherein correspondence between the media audio signal and the sample audio signal can be determined in accordance with a ratio between the number of matching values and the total number of values in the media binary matrix.

The matching values can include a second value in the sample binary matrix and a first value in a corresponding location in the media binary matrix.

The media audio signal can be longer than the sample audio signal.

The step of evaluating correspondence can include selecting a first segment of the media binary matrix and comparing between each value of the sample binary matrix and a corresponding value the first segment; selecting a second segment of the media binary matrix and comparing between each value of the sample binary matrix and a corresponding value the second segment; and assessing a first sum of matching values between the first segment and the sample binary matrix and a second sum of matching values between the second segment and the sample binary matrix; wherein correspondence between the media audio signal and the sample audio signal can be determined in accordance with a ratio between the first sum and the second sum.

The filter matrix can include filtering values the sum of which can be close to zero with respect to the sum of products thereof with a segment of the signal matrix having the unique parameter therein.

In the specification and claim which follows, the expressions "audience rating measurement" or simply "audience measurement" are intended to mean a measure of how many people are in an audience, usually in relation to radio listenership and television viewership, but also in relation to newspaper and magazine readership and to internet traffic on websites, inter alia. Audience measurement is employed to help broadcasters and advertisers determine who is listening/reading/viewing, rather than just how many people are listening/reading/viewing.

In the specification and claim which follows, the terms "audience share" and "market share" are intended to mean a relative audience and/or result, obtained from audience measurement. Most advertisers, inter alia, have a keen interest in determining characteristics of audience listenership/readership/viewership in terms of absolute audience, audience type, and market share, inter alia—as described further herein below.

BRIEF DESCRIPTION OF THE DRAWINGS

In order to understand the disclosure and to see how it may be carried out in practice, embodiments will now be described, by way of non-limiting examples only, with reference to the accompanying drawings, in which:

FIG. 2C is a sum matrix representing the sum of products of the filter matrix of FIG. 2B and segments of the matrix of FIG. 2A;

FIG. 2D is a binary matrix representing unique parameters in accordance with an example of the presently disclosed subject matter;

DETAILED DESCRIPTION OF EMBODIMENTS

Figure 1:
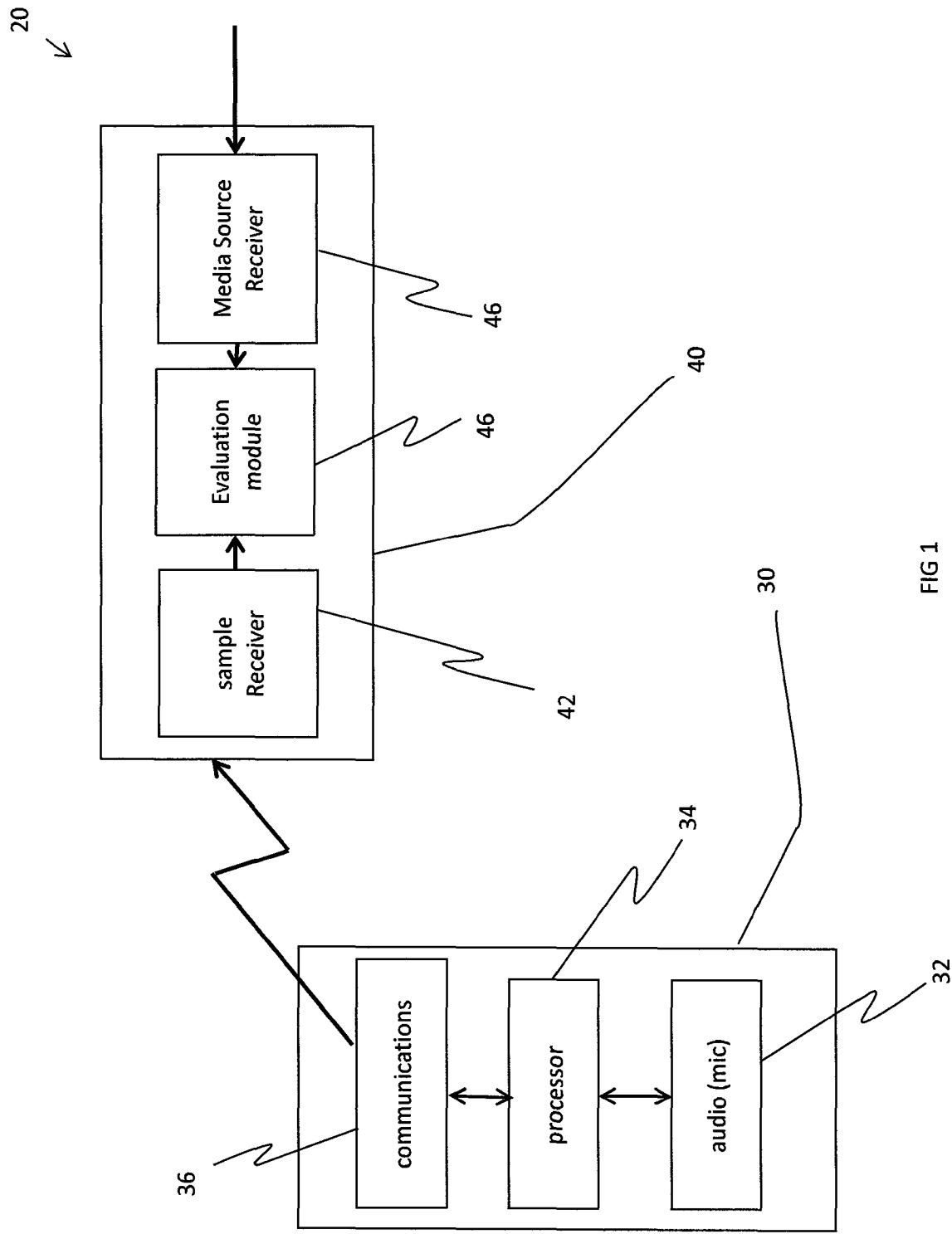
FIG. 1 is a block diagram illustration of the system for detecting audio media content in accordance with an example of the presently disclosed subject matter.

FIG. 1 is a block diagram illustrating the detecting system 20 in accordance with an example of the presently disclosed subject matter. According to this example the system includes a remote device 30 configured to receive an audio signal and to extract at least one unique parameter of the audio signal, and a central device 40 configured to compare the unique parameters with a dynamic stream of unique parameters characterizing audio signals of media content. The remote device 30 is configured to receive broadcast audio signals from a broadcast media device, such as TV, Radio or a computer having a webcast player, or similar capabilities. According to an example, the remote device 30 can include a recorder 32 configured to record audio signals in the vicinity of the remote device 30, for example broadcast media to which the person holding the device 30 is exposed, as well as other audio signals in the vicinity of the device 30. That is to say, the device can be configured to periodically record audio signals, which may or may not include media content therein.

The remote device can be a cellular phone, or other handheld device, which is carried around by a user, such that a fair assumption of the exposure of the user to media content can be determined. Alternatively, the remote device can be any computing device, such as a laptop or a desktop or the like, which is disposed adjacent a media device. According to other examples, the remote device can be a device attached to the media device, such as the TV, the Radio, etc.

The device 30 further includes a processor 34 configured to extract the unique parameters of the audio signals. The unique parameters of the audio signals can be certain parameters in the audio signal which can be isolated from other parameters present in the audio signal. The unique parameters can be for example an amplitude or intensity of a certain frequency above a predetermined threshold which is detected during a certain timeslot. According to another example, the unique parameters can be a set of varying values of amplitude or intensity of one or more frequencies occurring in a predetermined order. A detailed explanation to this process is provided herein below with reference to FIGS. 2A to 2D.

The device 30 is configured to form a sample dataset including all the occurrences of the unique parameters over a predetermined period of time. The device 30 further includes a communication module 36 configured for transmitting the unique parameters to the central device 40, for example via the internet or any other network. The central device 40 includes a communication module 42 which is configured to receive the unique parameters, and is further configured to extract unique parameters of audio signals received from at least one, and preferably a plurality of, media sources 46. The central device is configured to form a media dataset including all the occurrences of the unique parameters in the audio signals received from the media source, over a predetermined period of time. It is appreciated that the unique parameters extracted from the media source by the central device 40 are similar to the unique parameters extracted by the remote device. Thus, the central device 40 further includes an evaluation module 44 configured to evaluate the correspondence between the sample dataset received from the remote device 30 with the media dataset for a predetermined period of time. The evaluation process is described in detail herein below with reference to FIGS. 4A to 4C.

Figure 2A:
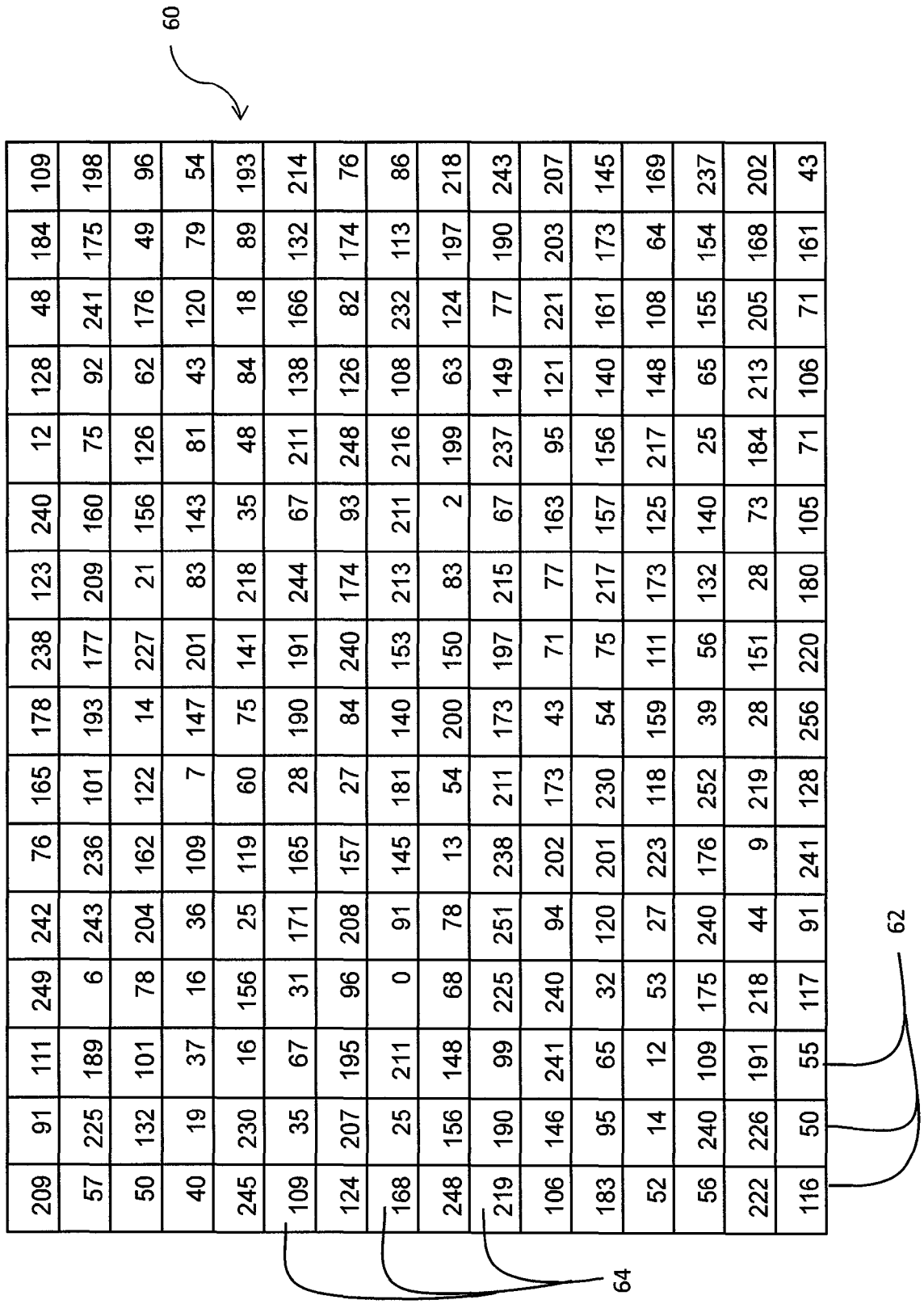
FIG. 2A is a matrix representation of an audio signal.

Reference is now made to FIG. 2A, the audio signal sampled by the remote device, can be digitized such that for each timeslot in the sample, an intensity is recorded for each frequency of for a range of frequency. According to an example, the audio signal is transformed to a frequency-domain, e.g. by utilizing Fourier transformation. The audio signal can be represented as a signal matrix 60 in the frequency-domain, wherein each vector 62 represents the intensity of a plurality of frequencies 64 over a period of time, such as over 90 milliseconds. Each component in the vector 62, for example, represents the intensity of a frequency of a range of frequencies 62 during the 90 milliseconds, as obtained by the Fourier transformation.

According to an example, the Fourier transformation is performed on overlapping sections of the audio signal, such that each vector represents a section of 90 milliseconds out of which 40 milliseconds overlap with the previous section. This way, if a unique parameter is disposed between an end of one timeslot and the beginning of a subsequent timeslot, the overlapping section facilitates detection of this unique parameter.

The Fourier transformation is carried out on further segments of 90 milliseconds timeslots, each such timeslot is represented by a vector 62 having a plurality of components each representing an intensity of a spectrum of frequencies 64. Although the vectors 62 illustrated here as having 16 components 64, i.e. intensities of 16 different frequency ranges, the vector can include more components for example 512, such that the Fourier transformation yields a more accurate information regarding the intensities of various frequencies in each timeslot.

In addition, although in the illustrated matrix 60, there are 16 vectors, i.e. data regarding 16 timeslots, 90 milliseconds each, the matrix can include any number of vectors. For example, if the audio signal is a 5 seconds recording of sounds in the surroundings of the remote device, the each 90 milliseconds can be analyzed separately, and if each 90 milliseconds includes an overlapping section of 40 milliseconds, the entire audio signal can be represented with 100 vectors each representing a timeslot of the audio signal.

It is appreciated that the length of the audio signal, the length of each timeslot, and the length of the overlapping section of each timeslot can be determined in accordance with the required accuracy or the unique parameters which are required to be extracted from the audio signal, as explained herein after.

In order to extract the unique parameters, a filter matrix 70 is provided and is configured to be applied on a segment of the signal matrix 60. The filter matrix 70 according to the present example, is configured to extract intensities which are unique with respect the surrounding, i.e. an unusual instance of intensity of a frequency range with respect the neighboring frequencies, and neighboring timeslots. For the sake of the present application the term 'unusual instance of intensity' refers to a high intensity with respect to neighboring frequencies, and neighboring timeslots, or few intensities of various frequencies which appear with a certain order. For example, in a first timeslot an intensity of first frequency range is above a predetermined threshold, and in a subsequent second timeslot the same intensity appears in a second frequency range, which is one frequency range above the first frequency range, and in a further subsequent third timeslot the same intensity appears in a third frequency range which is one frequency range above the second frequency range. Such instance is considered as an unusual instance of intensity, and can be used to detect the audio signal.

According to an example, analyzing the intensities is carried out by applying the filter matrix 70 on segments of the signal matrix 60. For the sake of simplicity, the selected section of the signal matrix is defined hereinafter as a segment matrix, (shown in FIG. 2B as three segment matrices 81, 82 and 83).

The filter matrix 70 can include filtering values arranged such that, when matrix multiplication between the filter matrix and the area matrix is applied, an unusual intensity is detected. According to an example, the filter 70 is configured such that the sum of products of the matrix multiplication provides an absolute value above a predetermined threshold when the segment matrix includes an unusual instance of intensity. The threshold can be determined in accordance with the absolute value received by matrix multiplication of other segment matrices of the signal matrix, i.e. segment matrices which do not include an unusual instance of intensity or intensities.

For example, the filter matrix 70 can be configured to detect an intensity of a first frequency range which is significantly different from the intensity of a second frequency range, one rang above the first range, and different from the intensity of a third frequency range, one range below the first range. In addition the filter matrix 70 detects an intensity of a first frequency range which is significantly different from the intensity of the same frequency range, in a previous timeslot, and different from the intensity of the same frequency range, in a subsequent timeslot.

Thus, the filter matrix 70 can be for example a 3×3 matrix having a center value 72 and surrounding values 74, configured such that the center value 72 is the sum of all the surrounding values 74, i.e. the sum of which is zero. This way, when the filter matrix 70 is multiplied with a segment matrix having relatively homogenous values, i.e. no unusual instance of intensity, the sum of products is zero or close to zero.

Alternatively, the filter matrix can include other values, it is appreciated that the values of the filter matrix are determined in accordance with the unique parameter it is required to detect.

The filter matrix 70 can be applied on a plurality of segment matrices 81, 82 and 83, such that when the filter matrix 70 is applied a segment matrix corresponding to a segment in the audio signal, which includes an unusual instance of intensity at the center thereof, the sum of products is far from zero as the segment matrix includes values at the center thereof significantly different than the surrounding values. It will be appreciated by those skilled in the art that the threshold which is defined as far from zero is an arbitrary threshold, which can be defined in accordance with the level of accuracy required. That is to say, in accordance with the illustrated example, the selected threshold is 600, i.e. if the sum of product of the filter matrix 70 and one of the segment matrices is above 600, it is considered as if an unusual instance of intensity is detected within the segment matrix, whereas in case the sum of product of the matrices is below 600, it is considered that no unusual instance of intensity is presented.

It is appreciated that the signal matrix 60 of the entire audio signal can be evaluated by applying the filter matrix 70 on various segments thereof. For example, the filter matrix 70 is first applied on a first segment matrix 81 on the top left corner of the signal matrix 60, following which it is applied on a second segment matrix which is disposed on the top of the signal matrix 60 and starting form one cell away from the right corner. The filter matrix 70 can thus be shifted to the right one cell at a time such that it is applied many times on all the segment matrices along the width of the signal matrix, until it is applied on the entire width of the signal matrix 60. As the filter matrix 70 reaches the top right corner of the signal matrix 60, it can be shifted one cell down such that it can now be applied on the entire width of the matrix 60 however one cell shifted down. This way, the filter matrix 70 can be applied on all the possible segment matrices of the audio signal.

It is appreciated that since the filter matrix 70 is shifted only one cell at a time, the segment matrices on which it is applied partially overlap one another. Thus, the segment matrices, in which the unusual instance of intensity is located precisely at the center thereof, can be detected. In other words, the precise timeslot and the precise frequency range in which the unusual instance of intensity occurred can be determined.

As noted hereinabove, applying the filter matrix 70 involves carrying out matrix multiplication, and calculating the sum of products thereof. Thus, applying the filter matrix 70 on many segment matrices yields a series of results each representing the sum of product of one segment matrix. For example, when the filter matrix 70 is applied on the segment matrix 81, the result is 860. Similarly, when the filter matrix 70 is applied on the segment matrix 82, the result is −206 and when the filter matrix 70 is applied on the segment matrix 83 the result is 592.

As shown in FIG. 2C the sum of product can be represented in a sum matrix 90, such that each cell represents the sum of product of the multiplication of the filter matrix 70 with one segment matrix. For example, the sum of product of the multiplication of the filter matrix 70 with the segment matrix 81 is presented in cell 91 in the sum matrix 90, the sum of product of the multiplication of the filter matrix 70 with the segment matrix 82 is presented in cell 92 in the sum matrix 90, and the sum of product of the multiplication of the filter matrix 70 with the segment matrix 83 is presented in cell 93 in the sum matrix 90.

It is appreciated that although according to the present example the filter matrix 70 is designed to detect a segment matrix in which the value at the center thereof is unusual, according to other examples, the filter matrix can be designed to detect a segment matrix in which the unusual intensity is disposed in other cells of the segment matrix.

Reference is now made to FIG. 2D, according to an example of the presently disclosed subject matter, the data regarding the sum of products is not be sent to the central device, rather any value which is above the predetermined threshold is designated as a positive detection. For example, in case the threshold is set to 600, each multiplication which yields a value higher than 600 is denoted as a positive detection of an unusual instance of intensity. In the illustrated example the denotation of detection of unusual instance of intensity is carried out by forming a binary matrix 100 having a 0 value for each matrices multiplication which yields a sum of less than 600 and a 1 value for each matrices multiplication which yields a sum of more than 600. Accordingly, value 101 is 1 as the sum of products of the filter matrix 70 and the segment matrix 81 of the signal matrix 60 yields 860, i.e. an unusual instance of intensity is detected. Similarly, values 102 and 103 are 0 as the sum of products of the filter matrix 70 and the segment matrix 81 and 82 yield −206 and 592 respectively, i.e. no an unusual instance of intensity is detected.

This way, the binary 100 can be sent the central device without providing any data regarding the actually intensities of the various frequency ranges. It is appreciated that since, in accordance with the presently disclosed subject matter, the remote device can be configured to receive samples of audio signals regardless of the presence of media signals in the vicinity thereof, the device receive or may record audio signal of private conversations carried out by the user of people in his surroundings. Thus, sending to the central device a Boolean data which represents detection of unusual instances of intensities, without any data regarding the actual intensity of the various frequency ranges does not breach the privacy of the user.

In addition, the Boolean data regarding the detection of unusual instances of intensities without any data regarding the actual intensities requires scientifically less storage space, and consumes less network resources, such that the remote device can send the data on a regular basis. According to an example, the remote device can be configured to send the data soon after the audio signal is received, such that the detection data is received by the central device in real-time, for example while the media source is still active.

Figure 3A:
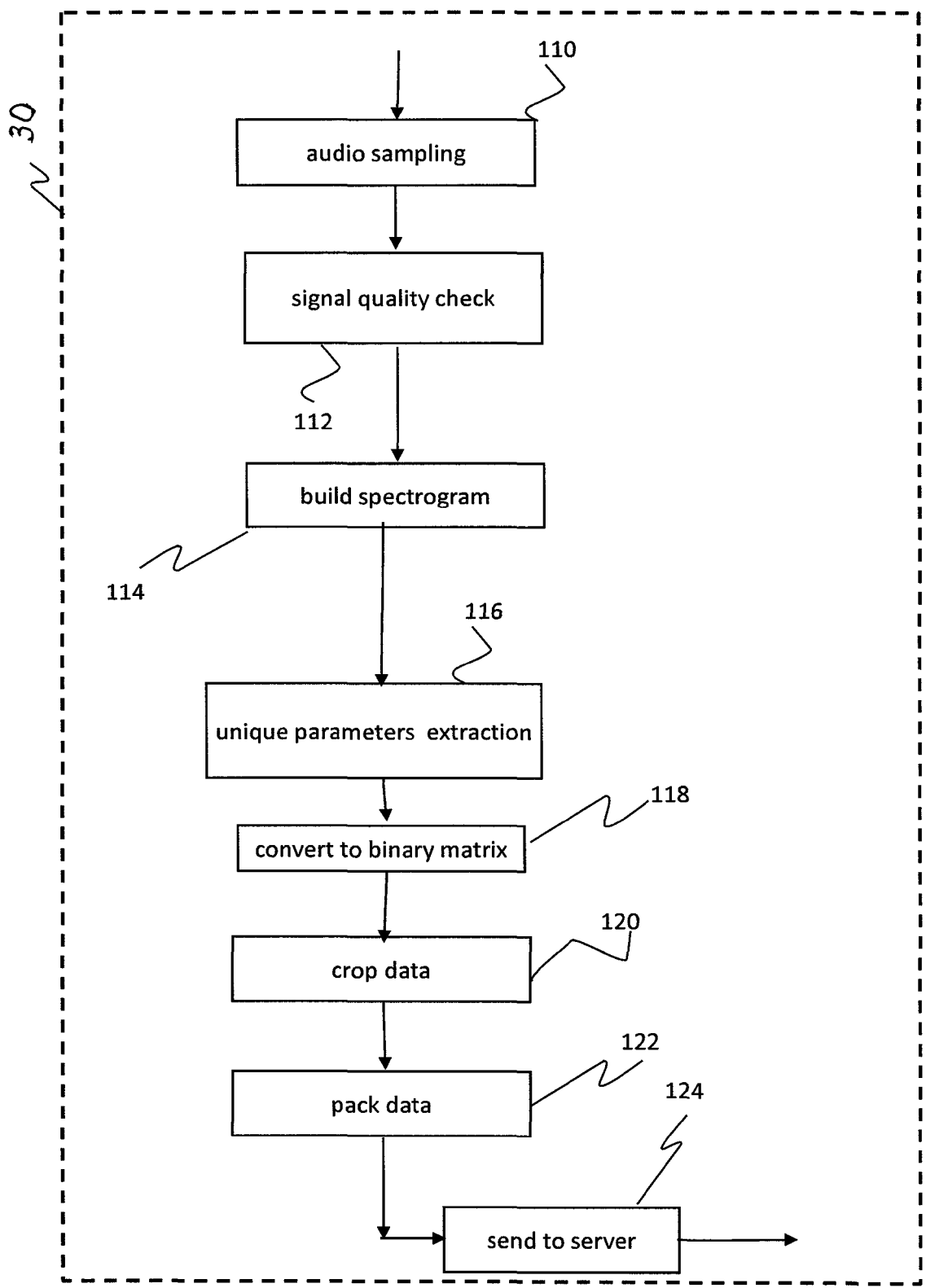
FIG. 3A is a flow chart illustration of the steps carried out by a remote device, in in accordance with an example of the presently disclosed subject matter.

Reference is now made to FIG. 3A, the remote device 30 can be configured to carry out an audio sampling (block 110) during which an audio signal is recorded or received. The signal may be recorded as an analog signal which can be saved as or converted into a digital form. According to an example, the remote device 30 runs a signal quality check (block 112) on the audio signal, so as to initially determine whether or not the signal includes audio data originated from a media source. For example, during the signal quality check, it can be determined if the audio signal include merely a background noise, such as a night when the user is asleep and there is not media source operating, or when the user is in a vehicle and the only audio signal sampled by the remote device 30 is a background noise of the vehicle.

According to an example the remote device 30 is configured to build a histogram (block 114) from the audio signal, which can be carried out by Fourier transformation.

Figure 2B:
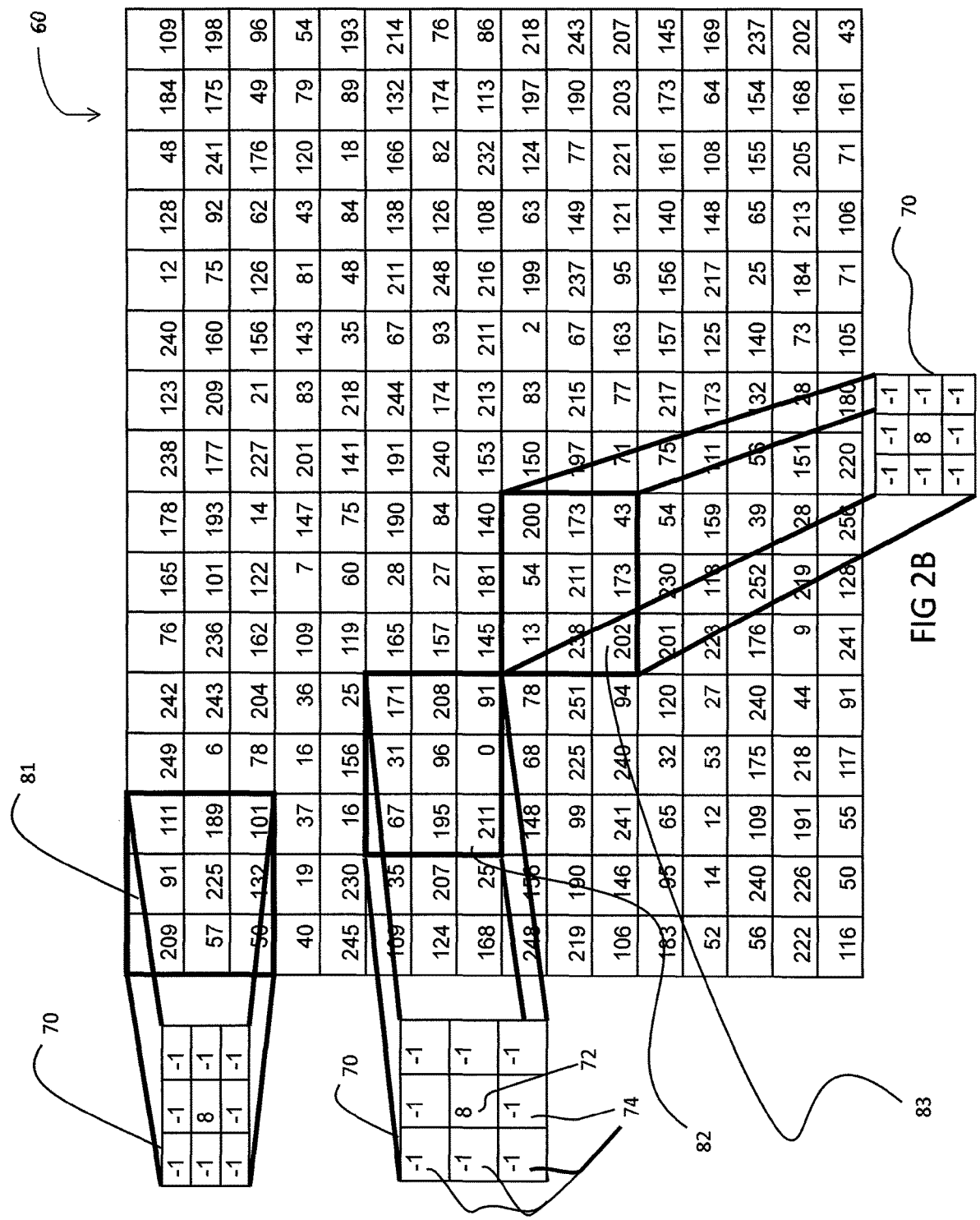
FIG. 2B is a filter matrix in accordance with an example of the presently disclosed subject matter for applying on the matrix of FIG. 2A.

Next, the remote device 30 perform a unique parameters extraction (block 116) during which parameters which are unusual with respect to neighboring parameters are detected, such as described herein above in connection with FIGS. 2A to 2C. The remote device 30 is further configured to convert the extracted parameters to a binary matrix (block 118) as explained herein above.

According to an example, the binary matrix is cropped (block 120), i.e. redundant data is removed. The redundant data can include unique parameters presented in frequencies in which these parameters can appear more frequently, i.e. cannot be used for matching audio signals.

According to an example, the data in the binary matrix is packed (block 122) for example by packing groups of bits into bytes. For example, the data of each vector in the binary matrix can be packed into packs of 32 bits each, facilitating thereby the evaluation process of the vector in the central device 40, as explained here in below. Finally the data is send to the central device (block 124) via any communication network, such as the internet, cellular network, etc.

Figure 3B:
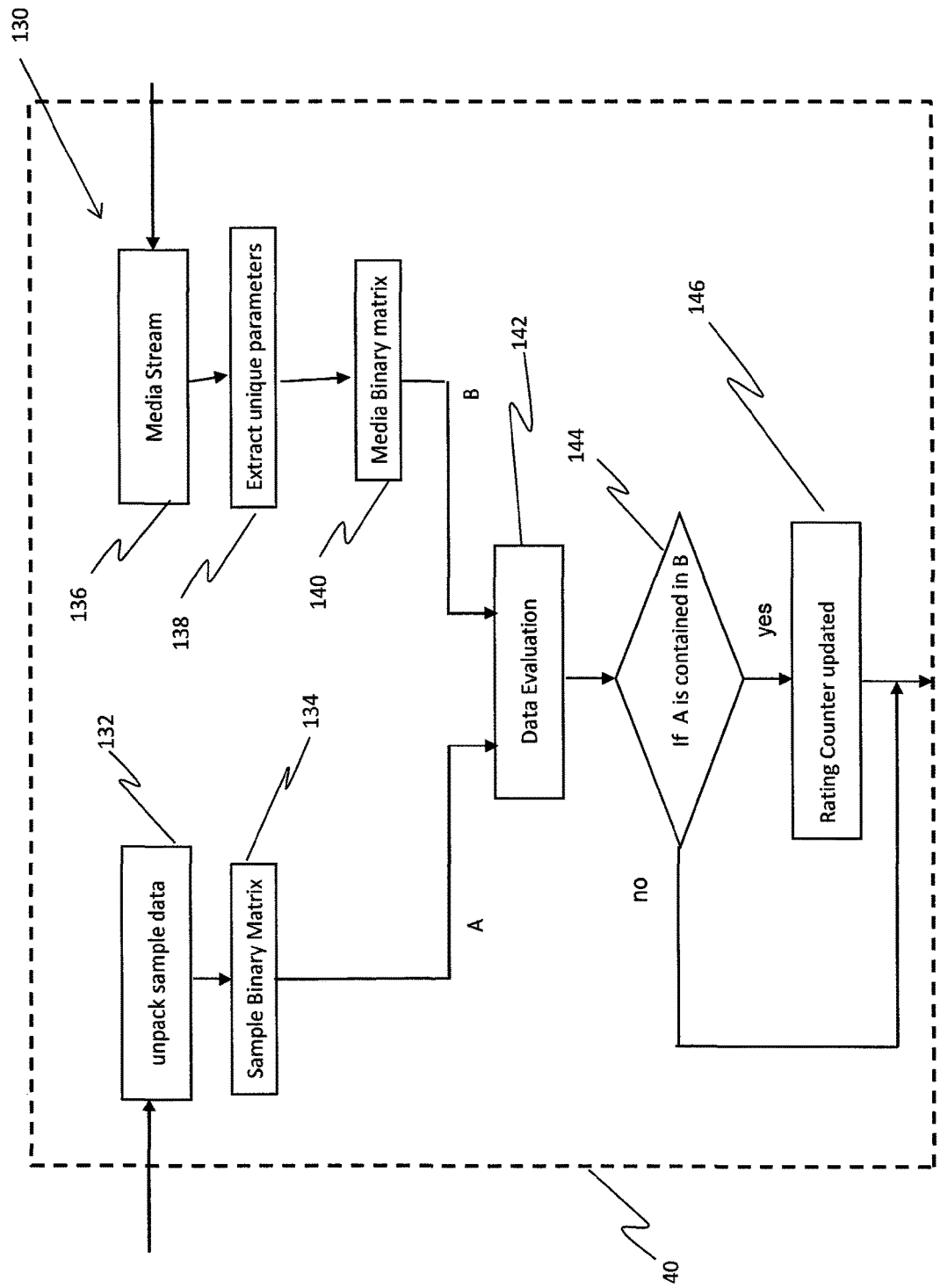
FIG. 3B is a flow chart illustration of the steps carried out by a Central device, in accordance with an example of the presently disclosed subject matter.

FIG. 3B is a block diagram illustrating an evaluation method (block 130) carried out by the central device 40 during which the unique parameters received from the remote device 30 are evaluate against a dynamic stream of unique parameters characterizing audio signals received from one or more media sources. The Dynamic database include unique parameters or a dataset indicating the presence of unique parameters within an audio signal. Since the audio signal received from the various media sourced are constantly changing, the dataset too is dynamic is updated constantly.

The data regarding the unique parameters is received from the remote device, for example via the internet, cellular network, etc. In case the data is packed, the central device first unpacks the dataset (block 132) and receives the binary matrix, such as shown for example in FIG. 2D.

The central device 40 is further configured to receive media stream (block 136), which can be a plurality of media audio signal received from one or more media sources. The media stream can be received as an analog signal, or can be received directly from the media source as a digital audio signal.

Unique parameters are extracted from the media stream (block 138) with the same key as in carried out by the remote device 30, as explained herein above with respect to FIG. 2A-2C. I.e., the central device 40 utilizes a filter matrix similar to the used in the remote device 30 such which can be configured for example to detect an unusual instance of intensity.

The unique parameters are then arranged in a media binary matrix (block 140), i.e. a matrix in which existence of a unique parameter, such as an unusual instance of intensity, is denoted by a binary value, such as 1. The threshold to determine the existence of a unique parameter can be the same as carried out by the remote device 30. This way, the central device 40 has a sample media matrix as received from the remote device 30 and a media binary matrix as extracted from the audio signal received from the media source.

According to an example, the media binary matrix can be extracted directly by the media source, and sent to the central device as a binary dataset. For example, a media provided, such as a radio station, or TV Channel, can be provided a dedicated device for extracting unique parameters, and sending to the central device a binary matrix representing the presence of these parameters.

The central device 40 then performs a data evaluation (block 142), to determine if the sample binary matrix received from the remote device 30 and the media binary matrix of the audio signal of the media source correspond.

It is appreciated that the sample binary matrix represents unique parameters of all the audio signals received by the remote device during the sampling. That is to say, the remote device according to an example can receive periodic samples of audio signals regardless of the existence of an audio signal originated from a media source. Thus, the binary matrix may be a representation of an audio signal of a user conversing or of any other noise in the vicinity of the remote device and not an audio signal from media source.

Accordingly, not only that it is required to match the unique parameters form the remote device to similar unique parameters of audio signals from the media sources received by the Central device, but it is also required to take into consideration other audio signals which cannot be matched to any audio signal received from the media sources.

In addition, even when the remote device is in the vicinity of a media device and the audio signal recorded by the remote device includes audio waves from the media device, the audio signal inevitably includes in addition other audio waves, such as noise etc. Thus, it is required to determine whether or not the sample binary matrix dataset received from the remote device 30 contains among other parameters, the unique parameters pertaining the audio waves from the media source.

Accordingly, during the evaluation process includes determining if the unique parameters presented in the media binary matrix are contained in the sample binary matrix among other parameters, which may be not relevant (block 144).

In case it is determined that the sample binary matrix contains among other parameters, the unique parameters inside the media binary matrix, the rating counter is updated (block 146). It is appreciated that the rating counter can be configured to record the time or other data related to the specific media exposure. For example, the remote device 30 can be configured to provide geographical location such that the media exposure can be evaluated in connection with specific geographical area. In addition, the sample binary matrix received from the remote device 30, and the media binary matrix of audio signal from the media source can be provided with a time/date stamp such that the media exposure can be determined in connection with a specific time or date.

Alternatively, the evaluation process can be carried out in relatively real time, i.e. the sample binary matrix can be sent immediately after the audio signal is received by the remote device 30 and the evaluation process is carried out soon after the sample binary matrix, such that in case the sample binary matrix is found to be containing the unique parameter of the media binary matrix, the time stamp of the positive match can be provided by an inner clock module of the central device. Since, the time interval between the broadcast time of the audio signal and the evaluation time is relatively short, the time can be easily deduced.

It will be appreciated that the evaluation process may take into consideration other factors, including the probability that the unique parameter detected by the remote device 30 and denoted on the sample binary matrix, can be detected in a different audio signal, i.e. the probability that an erroneously match will be determine.

Figure 4C:
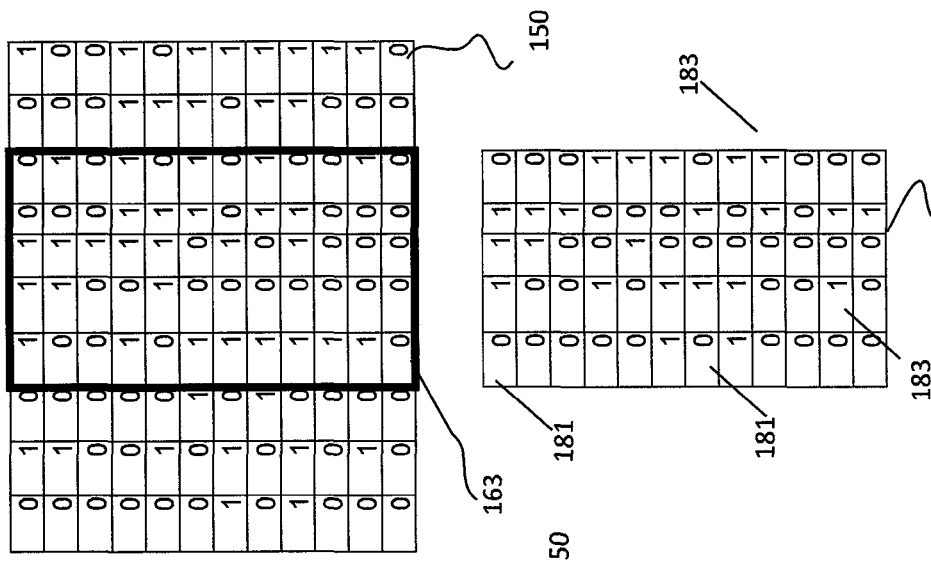
FIGS. 4A-C are steps of matrices values evaluation carried out between a sample binary matrix and a first second and third segments of a media binary matrix in accordance with an example of the presently disclosed subject matter.
Figure 4B:
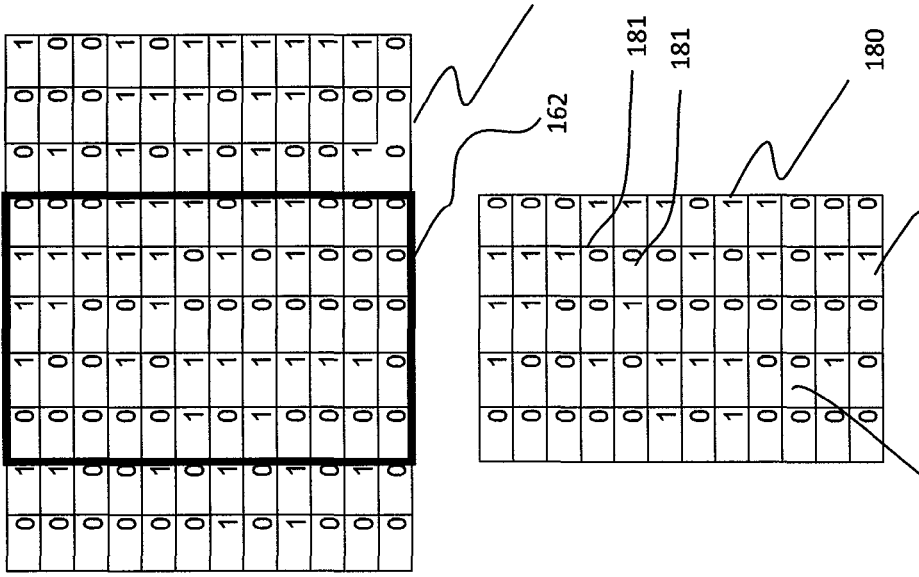
Figure 4A:
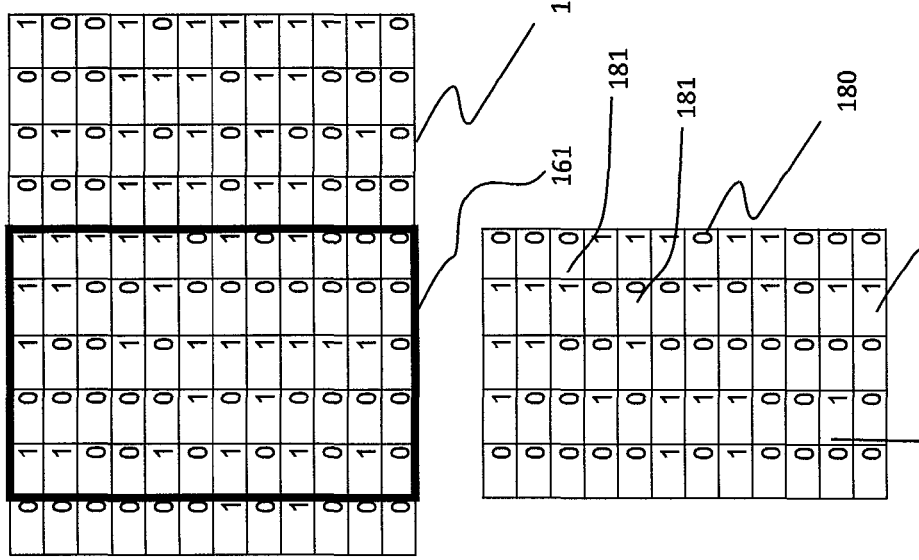

An example of such evaluation process is described here in after with reference to FIGS. 4A to 4C. The media binary matrix is typically longer than the sample binary matrix received from the remote device 30, such that the sample binary can be scanned over the media binary matrix evaluating thereby whether or not the sample binary matrix corresponds to any section of the media binary matrix. This way, the audio signal sampled by the remote device 30 can be relatively short, and the sample binary matrix generated by the remote device 30 can be easily generated and transferred to the Central device 40.

According to an example, the audio signal sampled by the remote device can be 6 second long, while the audio signal received directly from the media source can be 600 second long. As a result, since for example each 50 milliseconds timeslot is represented by a vector in binary matrix, the media binary matrix is 100 times longer than the sample binary matrix.

As shown in FIG. 4A, throughout the scanning process the sample binary matrix 180 (hereinafter SBM) is evaluated against a segment 161 of the media binary matrix 150 (hereinafter MBM). The SBM is then evaluated against an adjacent segments 162 of the MBM, i.e. the SBM is shifted sideward one vector, as illustrated in FIG. 4B, and a further subsequent segment 163 as illustrated in FIG. 4C. This is carried out until the SBM is evaluated against the entire MBM.

Throughout the evolution of each segment, each of the value of the SBM 180 is compared to the corresponding value on the segment of the MBM 150. As explained herein above, the SBM 180 may include unique parameters of audio signal which is not originated from a media source, rather it represents background noise. In other words, in order to determine a positive match, the segment of the MBM 150, which is evaluated, does not have to match the SBM 180, rather it has to be contained therein. That is to say, the unique parameters of the audio signal from the media source are expected to appear on the audio signal recorded by the remote device, while the unique parameters on the audio signal recorded by the remote device, are not necessarily expected to appear on the audio signal from the media source, as these parameters are likely to represent background noise.

According to an example the Central device can be configured to scan the SBM prior to the evaluation thereof against the MBM, and to determine the number of values indicating the presence of unique parameter in the audio signal, i.e. the number of 1 in the SBM. This way, if the SBM includes no 1 values (or any other value indicating the presence of unique parameter) or very little 1 values, it can be assumed that the audio signal from which the SBM was formed does not include any media signal.

Thus, in case the SBM includes in one of the cells thereof the value 1 while the corresponding value in the MBM is 0, such difference can be ignored. If however, the SBM includes in one cell the value 0 while the corresponding value in the MBM is 1, such difference is considered a lack of match.

The ratio of between the matching values and the sum of positive values (i.e. "1") in the MBM can be calculated as follows:

$$Ratio = \frac{\sum_{j=0}^{n}\sum_{i=0}^{m}(MBM[i,j] \& SBM[i,j])}{\sum_{j=0}^{n}\sum_{i=0}^{m}MBM[i,j]}$$

wherein "&" refers to logical AND, such that a value is counted as matching only when a positive value (i.e. "1") is detected in both the SBM and the corresponding value of the MBM.

According to other examples however, the SBM can be evaluated against the section of the MBM such that any value which does not match is considered as a mismatch. Accordingly, values which match are considered to be a match, values 183 on the SBM 180 which include 1 and do not match corresponding values on the segment of the MBM are considered a match regardless, while values 181 on the SBM 180 which include 0 and do not match corresponding values on the segment of the MBM are considered to be a mismatch.

The ratio of the number of matching values and the total number of values in the SBM is calculated for each segment. In the illustrated example, the ratio for segment 161 is 34.6%, the ratio for segment 162 is 80%, and the ratio for segment 163 is 35.7%.

It is appreciated that in accordance with an example, in order to determine if the SBM 180 corresponds to the MBM 150 the ratio of one of the segment must be above a predetermined threshold, and does not have to be a 100% match. In addition, since according to the presently disclosed subject matter the matching process is carried out with respect to unique parameters in the audio signal, it is expected that when the SBM 180 corresponds to a segment of the MBM 150, the matching ratio of the segment is significantly higher than the matching ratio of adjacent segments. Thus, for example, SBM 180 can be considered to correspond to segment 162 of the MBM 150 since the matching ratio with this segment has an absolute high value of 80%, and the matching ratio is more than twice the matching ratios of adjacent segments, i.e. 34.6% of segment 161 and 35.7% of segment 163. SBM 180 can thus be considered to match this segment of the MBM 150.

As indicated here in above the SBM 180 can be sent such that each vector is arranged in packs of 32 bits. Thus, the central device 40 can compare a pack of 32 bytes of the SBM 180 from the remote device with the segment of the MBM 150. Since the process carried out on a pack of 32 bits can be carried out in one action this expedites and facilitates the evaluation process. In case the two packs are found to be matching, the pack does not have to be opened, if however the two packs are found not to be matching, the packs are opened and each bit is evaluated separately, i.e., each value in the SBM 180 is compared separately to the corresponding value in the segment of the MBM 150.

According to an example, the central device can a server configured to collect datasets from a plurality of remote device relating to audio signals recorded by each of these device. The server can be further configured to receive a streaming audio signal from a plurality of media sources, such as radio stations, etc. the server evaluates the correspondence between the datasets relating to the audio signals sampled by the remote devices and the datasets extracted from the streaming audio signals.

Alternatively, the central device can a computing device coupled to one media source and configured to receive a streaming signal therefrom. The remote devices according to this example can be configured to send the datasets of the samples audio signals to a distribution server which then relays the datasets to one or more central devices coupled to each media source. This way, the evaluation process can be carried out by each of the computing device dedicated to one of the media source, and the computing power required is distributed between all the computing devices. It is thus noted that the term central device relates to the device which receives a plurality of datasets from one or more remote devices. The central device can be configured to receive media audio signal from many media sources or can be a dedicated device for evaluating the datasets against a single media signal received from one audio source. In the latter case the term central refers to fact that the device can receive datasets from a plurality of remote devices.

It is appreciated that the central device can be configured to evaluate the correspondence between the first dataset received from the remote device and a section of the streaming media signal received from the media source. For example, the central device can be configured to receive the first dataset as a certain time, and to obtain the second dataset relating to a section of the streaming audio extending from a predetermined time before the time the first dataset was received until a time in which the dataset was received. The length of the second dataset can be determined for example in accordance with the estimated delay time between the time the audio is recorded by the remote device and the time same audio signal is received by the central device.

Those skilled in the art to which the presently disclosed subject matter pertains will readily appreciate that numerous changes, variations, and modifications can be made without departing from the scope of the invention, mutatis mutandis.

The invention claimed is:

1. A system for monitoring media exposure, the system comprising:
   a remote device configured to receive a sample audio signal, to extract at least one unique parameter of said sample audio signal and to form a first dataset including data related to a presence of said unique parameter;
   a central device configured to receive said first dataset from said remote device, and to obtain at least one second dataset related to a presence of at least one unique parameter extracted from a media audio signal received from at least one media source;
   wherein said central device is further configured to evaluate correspondence between said first dataset and said second dataset and to collect data related to exposure of said remote device to said at least one media audio signal in accordance with said correspondence; and,
   wherein said instance of intensity at a frequency range is at a certain timeslot of said and wherein said instance is unusual with respect to adjacent timeslots of said sample audio signal and wherein a difference between a value of said instance of intensity and values of intensities of said adjacent frequency ranges is above a predetermined threshold.

2. The system according to claim 1 wherein said at least one unique parameter includes an instance of intensity at a frequency range which is unusual with respect adjacent frequency ranges of said sample audio signal.

3. The system according to claim 1 wherein said sample audio signal includes a plurality of frequency ranges and a plurality of timeslots and wherein said dataset includes data related to presence of said unique parameter in each of said frequency ranges for each of said timeslots and wherein said first dataset and said second dataset includes Boolean data type indicating said presence of said unique parameter.

4. The system according to claim 1 wherein said dataset includes only data related to a presence of said unique parameter, while values of said unique parameter are omitted from said dataset.

5. The system according to claim 1 wherein said central device is configured to receive said media audio signal from said at least one media source, to extract said at least one unique parameter and to form thereby said second dataset and wherein said second dataset relating to a section of said streaming audio extending from a predetermined time before said dataset was received until a time in which said first dataset was received.

6. The system of claim 5 wherein said central device is configured to receive media audio signals from a plurality of media sources and to obtain a second dataset from each of said media audio signals.

7. The system of claim 1 wherein said remote device is configured to detect unique parameters by generating a signal matrix of digital values each representing a value of a parameter of said sample audio signal for a certain frequency range at a certain timeslot; and by applying matrix multiplication between at least one segment of said signal matrix and a filter matrix configured such that a sum of products of said matrix multiplication provides a value above a predetermined threshold when said segment includes said unique parameters therein.

8. The system of claim 7 wherein said first dataset includes a sample binary matrix having a first value for indicating said presence, and a second value for indicating lack of presence of said unique parameter.

9. The system of claim 8 wherein said central device is configured to receive said media audio signal from said media source and to detect said unique parameter in said media audio signal and to form a media binary matrix having a first value for indicating said presence, and a second value for indicating lack of presence of said unique parameter.

10. The system of claim 9 said central device is configured for comparing between each value of said sample binary matrix and a corresponding value of at least a segment of said media binary matrix, and for assessing a number of matching values; wherein evaluating said correspondence includes assessing a ratio between said number of matching values and a total number of values in said media binary matrix.

11. The system of claim 10 wherein matching values include a second value in said sample binary matrix and a first value in a corresponding location in said media binary matrix and wherein said media audio signal is longer than said sample audio signal.

12. The system of claim 11 wherein said central device is further configured for selecting a first segment of said media binary matrix and comparing between each value of said sample binary matrix and a corresponding value said first segment, said central device is further configured for selecting a second segment of said media binary matrix and comparing between each value of said sample binary matrix and a corresponding value said second segment; wherein said central device is further configured for assessing a first sum of matching values between said first segment and said sample binary matrix and a second sum of matching values between said second segment and said sample binary matrix; wherein evaluating said correspondence includes assessing a ratio between said first sum and said second sum.

13. A method for determining correspondence between a media audio signal of a media source and a sample audio signal, the method comprising:
   receiving at the remote device a sample audio signal;
   generating a signal matrix of digital values each representing a value of a parameter of said sample audio signal for a certain frequency range at a certain timeslot;
   detecting at the remote device at least one unique parameter in said sample audio signal by applying matrix multiplication between a at least one segment of said signal matrix and a filter matrix configured such that a sum of products of said matrix multiplication provides a value above a predetermined threshold when said segment of said signal matrix includes said unique parameters therein, wherein said filter matrix includes filtering values the sum of which is close to zero with respect to the sum of products thereof with a segment of said signal matrix having said unique parameter therein;

forming at the remote device a first dataset including data related to a presence of said unique parameter;

receiving at the central device said first dataset from said remote device;

obtaining at the central device at least one second dataset related to a presence of at least one unique parameter extracted from a media audio signal received from at least one media source;

evaluating correspondence between said first dataset and said second dataset.

14. The method of claim 13 wherein said step of forming a first dataset includes:

forming a sample binary matrix including a first value for indicating said presence, and a second value for indicating lack of presence of said unique parameter.

15. The method of claim 14 wherein said step of obtaining said second dataset includes:

receiving said media audio signal from said media source;

detecting said unique parameter in said media audio signal; and forming a media binary matrix including a first value for indicating said presence, and a second value for indicating lack of presence of said unique parameter.

16. The method of claim 15 wherein said step of evaluating correspondence includes comparing between each value of said sample binary matrix and a corresponding value of at least a segment of said media binary matrix, and assessing a number of matching values; wherein correspondence between said media audio signal and said sample audio signal is determined in accordance with a ratio between the number of matching values and the total number of values in said media binary matrix.

17. The method of claim 16 wherein matching values include a second value in said sample binary matrix and a first value in a corresponding location in said media binary matrix and wherein said media audio signal is longer than said sample audio signal.

18. The method of claim 17 wherein said step of evaluating correspondence includes:

selecting a first segment of said media binary matrix and comparing between each value of said sample binary matrix and a corresponding value said first segment;

selecting a second segment of said media binary matrix and comparing between each value of said sample binary matrix and a corresponding value said second segment;

assessing a first sum of matching values between said first segment and said sample binary matrix and a second sum of matching values between said second segment and said sample binary matrix; wherein correspondence between said media audio signal and said sample audio signal is determined in accordance with a ratio between said first sum and said second sum.

* * * * *